(12) United States Patent
Landry

(10) Patent No.: US 10,099,524 B1
(45) Date of Patent: Oct. 16, 2018

(54) ADJUSTABLE TRAILER HITCH

(71) Applicant: William M Landry, Coden, AL (US)

(72) Inventor: William M Landry, Coden, AL (US)

( * ) Notice: Subject to any disclaimer, the term of this patent is extended or adjusted under 35 U.S.C. 154(b) by 0 days.

(21) Appl. No.: 15/793,772

(22) Filed: Oct. 25, 2017

(51) Int. Cl.
*B60D 1/40* (2006.01)
*B60D 1/07* (2006.01)
*B60D 1/06* (2006.01)

(52) U.S. Cl.
CPC . *B60D 1/07* (2013.01); *B60D 1/06* (2013.01)

(58) Field of Classification Search
CPC ...................................................... B60D 1/07
USPC ......... 280/416.1, 491.3, 478.1, 479.3, 456.1, 280/479.2, 477, 491.1, 511
See application file for complete search history.

(56) References Cited

U.S. PATENT DOCUMENTS

| | | | | |
|---|---|---|---|---|
| 4,350,362 A | * | 9/1982 | Landers | B60D 1/40 280/479.3 |
| 5,044,652 A | * | 9/1991 | Brisson | B60D 1/07 280/416.1 |
| 5,048,854 A | * | 9/1991 | Clark | B60D 1/38 280/477 |
| 5,351,982 A | | 10/1994 | Walrath | |
| 5,560,630 A | * | 10/1996 | Phares | B60D 1/06 280/416.1 |
| 5,857,693 A | | 1/1999 | Clark, Jr. | |
| 5,910,217 A | * | 6/1999 | Sargent | B60D 1/32 280/455.1 |
| 5,915,714 A | | 6/1999 | Bell et al. | |
| 6,126,188 A | * | 10/2000 | Volodarsky | B60D 1/07 224/544 |
| 7,347,440 B2 | | 3/2008 | Shannon | |
| 7,556,279 B2 | * | 7/2009 | Suhling | B60D 1/06 280/511 |
| 7,850,192 B2 | * | 12/2010 | Ceccarelli | B60D 1/44 280/478.1 |
| 7,909,350 B1 | * | 3/2011 | Landry | B60D 1/06 280/416.1 |

* cited by examiner

*Primary Examiner* — Jacob D Knutson
(74) *Attorney, Agent, or Firm* — George L. Williamson

(57) ABSTRACT

Method and apparatus for an adjustable trailer hitch which allows each of three differently sized user selected balls to be adjusted laterally and longitudinally so that the tongue of the trailer can be more easily attached to the towing vehicle. The trailer hitch has a body portion mounted on a slide-tube for insertion in a receiver-tube wherein the body portion has an interior space which allows the draw bar to move laterally from side to side inside the space along with a plurality of apertures so that the draw bar can be laterally adjusted using the apertures and a locking pin. When the draw bar is moved all the way to the left or right the user selected ball is automatically aligned with the receiver tube due to the effective sizing of the draw bar which is assured by the right and left stops of the body portion contacting the right and left outer edges of the draw bar.

15 Claims, 2 Drawing Sheets

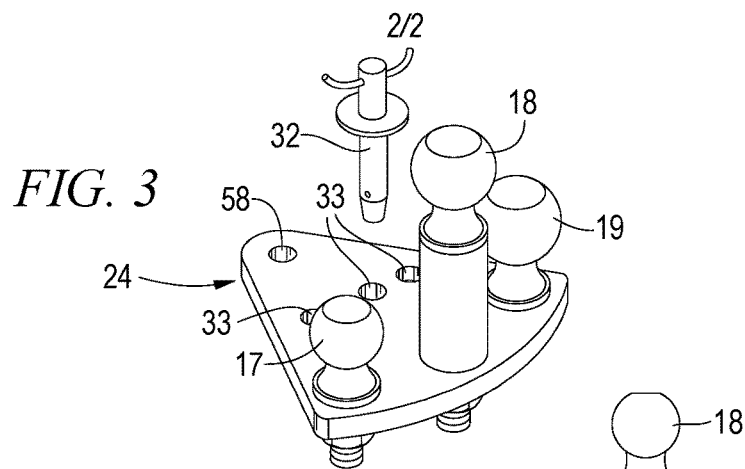
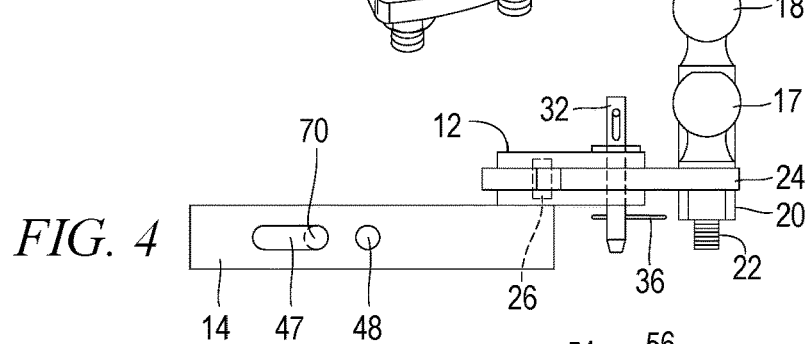
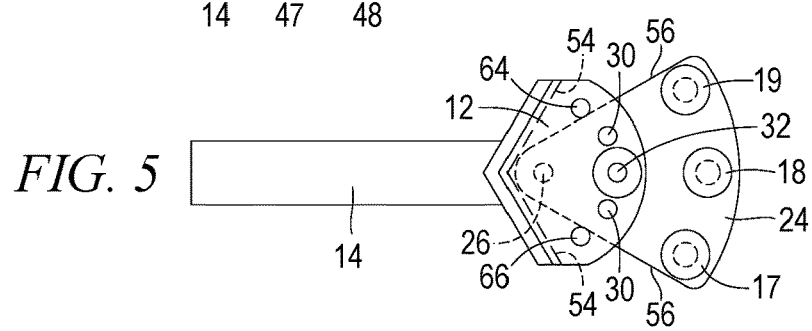
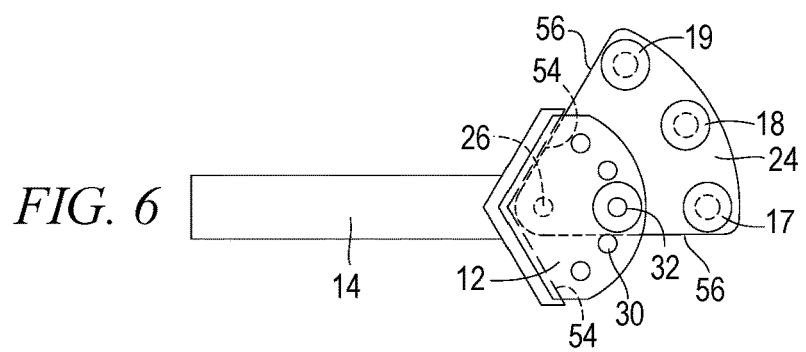
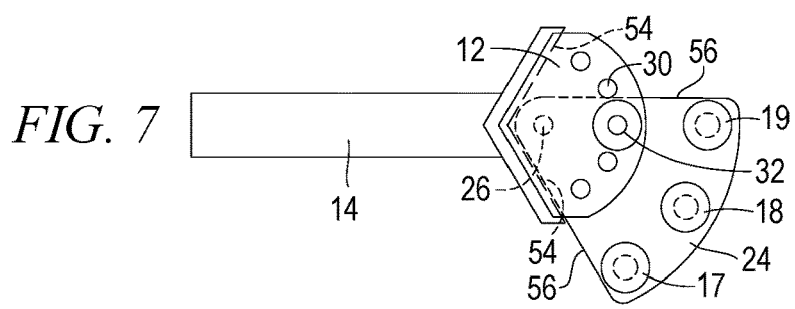

ADJUSTABLE TRAILER HITCH

BACKGROUND OF THE INVENTION

Field of the Invention

The present invention relates generally to trailer hitches and, more particularly, is concerned with an adjustable trailer hitch.

Description of the Prior Art

Adjustable trailer hitches have been described in the prior art, however, none of the prior art devices disclose the unique features of the present invention.

In U.S. Pat. No. 5,857,693 dated Jan. 12, 1999, Clark, Jr., disclosed a dial ball mount for a trailer hitch. In U.S. Pat. No. 7,347,440 dated Mar. 25, 2008, Shannon disclosed a trailer hitch with a portable trailer hitch balls. In U.S. Pat. No. 5,560,630 dated Oct. 1, 1996, Phares, et al., disclosed a rotating multiple ball trailer hitch. In U.S. Pat. No. 5,044,652 dated Sep. 3, 1991, Brisson disclosed a multi-ball rotatable trailer hitch. In U.S. Pat. No. 5,915,714 dated Jun. 29, 1999, Bell, et al., disclosed a multi-attachment spin hitch system and method. In U.S. Pat. No. 5,351,982 dated Oct. 4, 1984, Walrath disclosed a cluster ball trailer hitch. In U.S. Pat. No. 7,909,350 dated Mar. 22, 2011, Landry disclosed a method and apparatus for an adjustable trailer hitch.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses an adjustable trailer hitch which allows each of three differently sized user selected balls to be adjustable laterally and longitudinally so that the tongue of the trailer can be more easily attached to the towing vehicle. The present invention has a body portion mounted on a slide-tube for insertion in a receiver-tube wherein the body portion has an interior pocket or space which allows the draw bar having the three balls mounted thereon to move laterally from side to side inside the pocket along with a plurality of apertures so that the draw bar can be laterally adjusted using the apertures and a first locking pin. When the draw bar is moved laterally the corresponding user selected ball is automatically aligned with the receiver tube due to the effective sizing of the draw bar which is assured due to the right and left stops of the body portion contacting the right and left outer edges of the draw bar. The slide-tube also slides longitudinally inside the receiver-tube wherein a second locking pin holds the slide-tube in the receiver-tube allowing the entire trailer hitch to be longitudinally adjustable along the longitudinal axis of the towing vehicle.

An object of the present invention is to allow the ball of a trailer hitch to be both laterally and longitudinally adjustable on the towing vehicle. A further objective of the present invention is to provide an adjustable trailer hitch having three differently sized user selected balls thereon each of which selected balls becomes automatically aligned with the receiver tube when a towed trailer is attached to a towing vehicle. A further objective of the present invention is to provide an adjustable trailer hitch which can be easily and relatively inexpensively manufactured. A further object of the present invention is to provide an adjustable trailer hitch which is easy to use.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 3 is a perspective view of portions of the present invention.

FIG. 4 is a side elevation view of portions of the present invention.

FIG. 5 is a plan view of portions of the present invention showing the draw bar in a central position.

FIG. 6 is a plan view of portions of the present invention showing the draw bar in a right position.

FIG. 7 is a plan view of portions of the present invention showing the draw bar in a left position.

LIST OF REFERENCE NUMERALS

Figure 1:
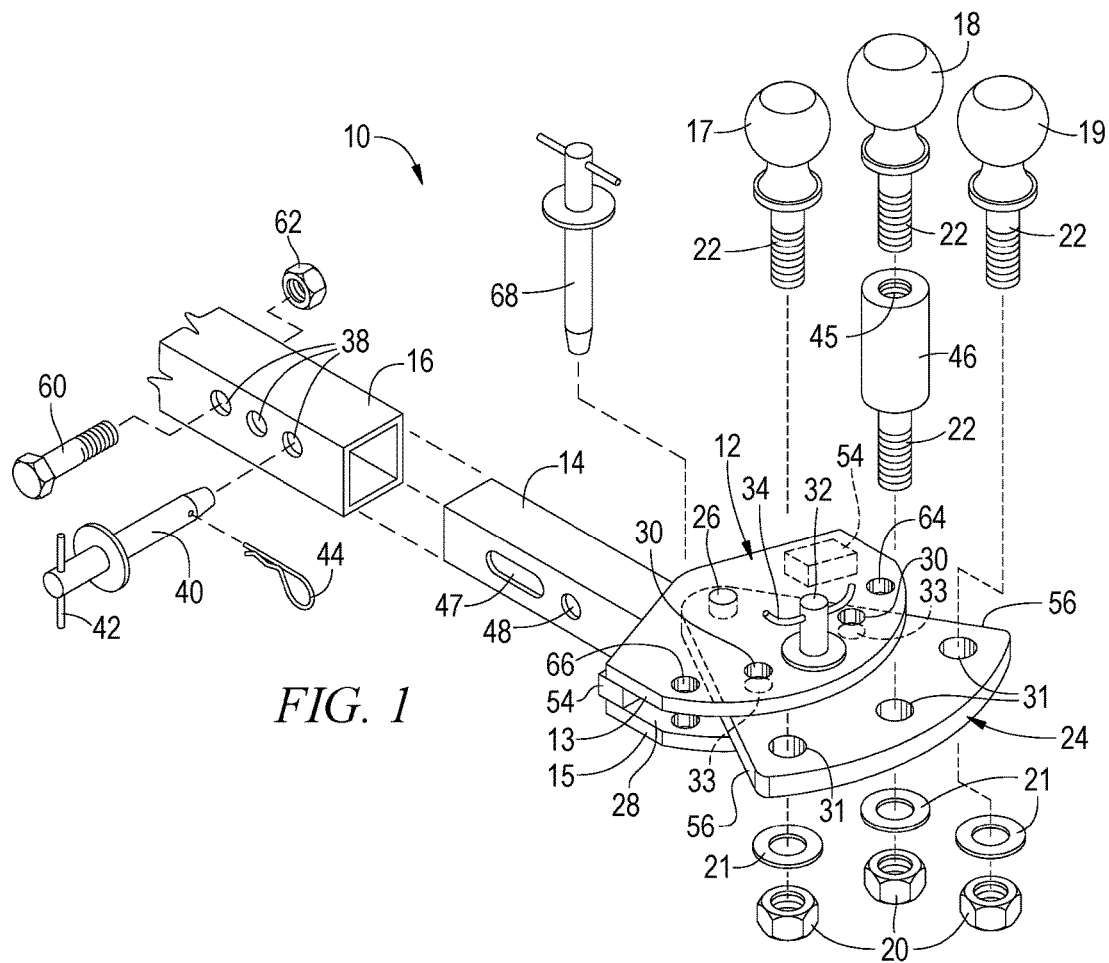
FIG. 1 is a perspective view of the present invention.
Figure 2:
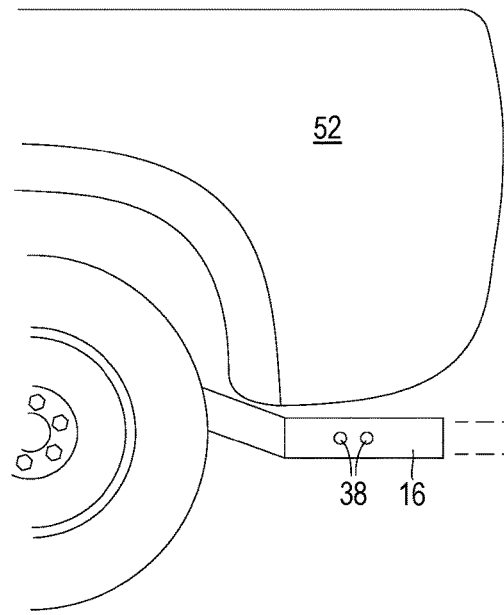
FIG. 2 is a side elevation view of the present invention and portions of a towing vehicle.
Figure 2:
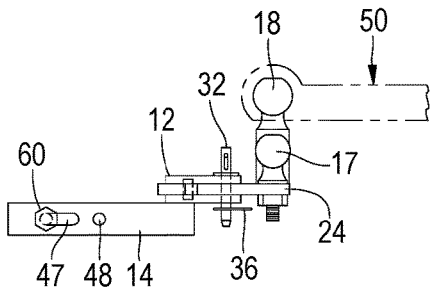

With regard to reference numerals used, the following numbering is used throughout the drawings.

10 present invention
12 body
13 upper portion
14 slide tube
15 lower portion
16 receiver tube/receiving tube
17 ball
18 ball
19 ball
20 nut
21 washer
22 threaded end
24 draw bar
26 pivot pin
28 interior pocket
25 apertures
31 apertures
32 locking pin
33 apertures
34 handle
36 cotter pin
38 aperture
40 locking pin
42 handle 44 cotter pin
45 threaded hole
46 vertical extension
47 longitudinal adjustment slot
48 aperture
50 trailer tongue
52 towing vehicle
54 stops of body
56 outer edges of draw bar
58 aperture
60 bolt
62 nut
64 right hole stop
66 left hole stop
68 stop pin
70 portion

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 7 illustrate the present invention wherein an adjustable trailer hitch is disclosed.

Turning to FIGS. 1-4, therein is shown the present invention 10 having a body 12 mounted on one end, being the rear end, of a slide-tube 14 so that the other end of the slide tube can be mounted by insertion into a conventional receiver tube 16 wherein three differently sized user selectable balls 17, 18, 19 for receiving the tongue 50 of a trailer (trailer not shown) is attached thereto wherein each ball is attached by a nut 20 and washer 21 mounted on a threaded end 22 so that the balls are securely attached to an enlarged draw bar 24 mounted in a body 12 having an upper portion 13 and a lower portion 15. The enlarged draw bar 24 is pivotally mounted to a pivot pin 26 in aperture 58 which is mounted near the front of the body 12 wherein an interior space or pocket 28 is disposed inside the body 12 between upper portion 13 and lower portion 15 and allows the draw bar 24 to move within the interior pocket in a left and right lateral direction to allow the draw bar to be laterally adjustable. The movable pie-shaped draw bar 24 is effectively sized much larger than normally so that when it is moved all the way to the left or right the user selected ball 17 or 19 is automatically aligned with the longitudinal center line of the receiver tube 16 of the standard square hitch and so that the corresponding apertures 31 of the draw bar are automatically lined up due to the size and spacing of the right and left stops 54 (as best illustrated in FIGS. 5-7) contacting the right and left outer edges 56 of the effectively sized draw bar 24. Also shown is a vertical extension 46 having a threaded hole 45 on its upper end for receiving threaded end 22 of ball 18 along with a threaded lower portion 22 for mounting on nut 20.

The body 12 has a plurality of spaced apart apertures 30 disposed from one side to the other side being three in number and wherein a first locking pin 32 having a handle 34 thereon can be inserted through one of the selected apertures 30 and through the mating aperture 33 within the draw bar 24 so that the draw bar can be locked in one of three user selected positions using apertures 30. Note that the three apertures 30 are disposed inside of the two outer apertures 64, 66 in body 12 the operation of which will be explained later herein. Cotter pin 36 can be placed on locking pin 32 in order to secure it in position. A plurality of apertures 38 being equally sized and equally spaced apart are disposed in receiver tube 16 for receiving a second locking pin 40 having handle 42 thereon and mating cotter pin 44 thereon for securing the second locking pin in place on the selected aperture on receiver tube 16. Nut 60 and bolt 62 are also shown in FIG. 1 for being installed through a user selected aperture 38 so that nut 60 and bolt 62 are generally permanently installed but could be uninstalled when necessary such as to initially insert the insert tube 14 into receiver tube 16 or in an emergency. It can be seen that the slide tube 14 has a longitudinally elongated adjustment slot 47 thereon and a plurality of apertures 48 thereon so that the slide tube can be inserted into the receiver tube 16 so that the locking bolt 60 and 62 is inserted through the longitudinal adjustment slot 47 to allow the trailer hitch ball 18 to be longitudinally adjustable on the towing vehicle; likewise, the insert tube 14 could be adjusted longitudinally in the conventional manner using aperture 48, pin 40, and apertures 38 of the receiver tube 16.

In operation, the slide tube 14 having pin 40 may be inserted through longitudinal adjustment slot 47 and positioned in a user selected position relative to the trailer and towing vehicle. Furthermore, the draw bar 24 can be laterally operated with the locking pin 32 in any one of the apertures 30 of the body 12 of the trailer hitch according to the preference of the operator so as to make it easy to connect the tongue of the trailer to the ball 18 on the towing vehicle 52. Also, stop pin 68 can be placed in either left or right hole stop 64, 66 so as to provide a stop for either the left or right outer edge of draw bar 24 so as to align ball 18 on the draw bar so that central hole 30 on the body 12 aligns with central hole 33 on the draw bar.

In operation, if the operator of the towing vehicle 52 intended to use the large pedestal ball 18 he would place stop pin 68 in the left hole 66 if the trailer tongue 50 was positioned at an angle to the left (i.e., the drivers side) rear of the towing vehicle 52 and in the right hole 64 if the trailer 50 was positioned at an angle to the right (i.e., the passengers side) rear of the towing vehicle 52. In this manner, the draw bar 24 could be moved back and forth laterally left or right until the ball 18 was positioned under the tongue 50 of the trailer and also the slide tube 14 could be moved longitudinally, i.e., to the front or rear, by using slot 47 until the ball 18 was properly positioned with respect to trailer tongue 50 at which time pin 40 would be positioned in hole 48 of the slide tube 14. This is accomplished by pulling the towing vehicle 52 forwardly and abruptly stopping so as to cause the slide tube 14 to slide forwardly in receiver tube 16 and be stopped by bolt 60 in slot 47 which simultaneously causes aperture 48 to align with user selected hole 38 so that pin 40 can be easily placed in aperture 48 which is automatically aligned with aperture 38 which occurs because the distance from the rear portion 70 of slot 47, as shown in FIG. 4, and aperture 48 equals the distance between apertures 38 of. All of these features allow for longitudinal (toward the front or rear) and lateral (to the left or right) adjustment of the trailer hitch of the present invention 10. Longitudinal adjustment is provided by slot 47 and apertures 38 and 48 operating with bolt 60 and pin 40. Lateral adjustment is provided by draw bar 24 moving inside body 12 and cooperating with stops 54 and stop pin 68 and apertures 64, 66, 30 and 31.

It is expected that normally the draw bar 24 will be positioned so that its central aperture 31 will be aligned with the central aperture 30 of the body 12 which causes the longitudinal axis of the draw bar and slide tube 14 to be aligned. In summary, the operation of the present invention 10 could be described as follows: the towing vehicle 52 is positioned so that the user selected ball 17, 18, 19 is within a few inches from the tongue 50 of the trailer and aligning the apertures 38 on the receiving tube 16 and aperture 48 of the slide tube 14 and placing the locking pin 40 in apertures 38 in the receiving tube 16; aligning the user selected ball 17, 18, 19 with tongue 50 and then placing the locking pin 32 in the user selected apertures 30 and 33 by moving the draw bar 24 in the direction which best aligns the balls 17, 18, 19 and tongue 50 with the receiver tube 16 and slide tube 14; then positioning the towing vehicle 52 so as to connect the tongue 50 with the user selected ball 17, 18 or 19. These steps also can be used in conjunction with longitudinal adjustment with slot 47 and the brakes of the towing vehicle 52 as previously disclosed.

Turning to FIGS. 5-7, shown therein is the present invention 10 with the draw bar 24 shown in various user selected positions relative to the body 12. FIG. 5 shows draw bar 24 disposed in a central position with ball 18 in a centered position and pin 32 in central aperture 30 of body 12 and central aperture 33 of draw bar 24 so that ball 18 is aligned with slide tube 14 and receiver 16. FIG. 6 shows draw bar 24 disposed in a right position so that ball 17 is in a centered position and pin 32 is in central aperture 30 of body 12 and left aperture 33 of draw bar 24 so that ball 17 is aligned with slide tube 14 and receiver 16 and wherein right edge 56 abuts right stop 54. FIG. 7 shows draw bar 24 disposed generally in a left position so that ball 19 is in a centered position and pin 32 is in the central aperture 30 of body 12 and right aperture 33 of draw bar 24 so that ball 19 is aligned with slide tube 14 and receiver 16 and wherein left edge 56 abuts left stop 54. FIGS. 5-7 illustrate that the effective size and shape of draw bar 24 is critical to the unique ability of the present invention 10 to automatically align the user selected ball 17, 18 or 19 with the slide tube 14 so that the tongue 50 of a trailer is also properly aligned for towing. FIGS. 6-7 also illustrate that ball 17 aligns with the slide tube 14 when draw bar 24 is moved so that its right edge 56 abuts right stop 54 and that ball 19 aligns with the slide tube 14 when draw bar 24 is moved so that its left edge 56 abuts left stop 54.

Note that by rotating the body 12, 180 degrees in the receiver tube 16 and turning the ball 18 over with respect to the body, i.e., inserting the ball on the opposite of the draw bar 24, that the elevation of the ball with respect to the ground can be changed 3-4 inches. Three common sized balls include 1⅞", 2", and 2 5/16" and all three of these sizes could be included on the trailer hitch of the present invention 10. The draw bar 24 has the shape of a pie-shaped part of a circle which is a part of a circle enclosed by two radii of a circle and their intercepted arc of the circle.

References to either the left or right sides of parts/portions of the present invention 10 are taken from the perspective of an observer standing at the rear of the towing vehicle and looking toward the front of the towing vehicle. References to the front or rear of parts/portions of the present invention 10 are taken from the perspective that the towing vehicle 52 is in front of the trailer tongue 50; for example, the receiver tube 16 is in front of pivot pin 26.

By way of summary and by making reference to FIGS. 1-7, the present invention 10 may be described as a method for making an adjustable trailer hitch for connecting a trailer 50 to a vehicle 52, the vehicle having a receiving tube 16 mounted thereon, the receiving tube having at least one aperture 38 extending horizontally therethrough, including the steps of a) providing a slide tube 14 having front and rear end portions and upper and lower surfaces, wherein the front end portion of the slide tube is slidably insertable into and removable from the receiving tube, the slide tube having at least one first aperture 48 extending horizontally therethrough, the slide tube having a slot 47 extending horizontally therethrough, wherein the slot is longitudinally elongated; b) providing a body 12 having front and rear end portions, upper and lower portions, and left and right side portions, a left stop 54 being disposed on the left side portion and a right stop 54 being disposed on the right side portion, wherein the lower front is disposed on the upper, rear of the slide tube, the body having an interior space 28 therein, wherein the interior space is formed between and bounded by the upper 13 and lower 15 portions, the body having a plurality of second apertures 30 extending vertically therethrough, wherein the second apertures pass entirely through the upper and lower portions and are disposed adjacent the rear portion of the body in a spaced apart relationship between the left and right side portions; c) mounting a pivot pin 26 generally vertically in the body; d) providing a pie-shaped draw bar 24 having front and rear end portions and left and right outer edges being disposed in the interior space of the body, the front portion being connected to the pivot pin, the rear portion extending from the rear of the interior space an effective distance to allow for a plurality of third apertures 31 to be mounted thereon so that each third aperture has a ball mounted therein providing at least three balls 17, 18, and 19 to be mounted thereon, the draw bar having a plurality of fourth apertures 33 extending vertically therethrough; e) wherein the draw bar is laterally pivotable on the pivot pin between the first and the second side portions of the body so that the three balls can be moved laterally back and forth between the first and second side portions of the body, wherein the fourth apertures are configured to align with the plurality of second apertures as the draw bar pivots laterally between the first and second side portions of the body; f) providing a first locking pin 32 being removably inserted into the plurality of second apertures 30 and the fourth apertures 33 so that the draw bar can be locked into a user selected aperture of the plurality of second apertures as the draw bar pivots laterally between the first and second side portions of the body; and, g) providing a second locking pin 40 being removably insertable into the first aperture of the slide tube and the aperture of the receiving tube so that the slide tube can be locked into a user selected first aperture of the slide tube so that the ball on the draw bar can be moved back and forth in the longitudinal direction relative to the vehicle.

Furthermore, wherein the upper front portion of the body can be disposed on the lower, rear portion of the slide tube, and, wherein the number of second apertures ranges from three to five, and, wherein a top view of the draw bar resembles a slice of pie, and, wherein a top view of the apparatus shows that the draw bar at its widest point is slightly wider than the body. Furthermore, wherein the pie-shaped draw bar is effectively sized, configured or shaped so that when the right outer edge 56 of the draw bar contacts the right stop 54 of the body the left fourth aperture 33 is aligned with a longitudinal center line of the draw bar and when the left outer edge 56 of the draw bar contacts the left stop 54 of the body the right fourth aperture 33 is aligned with a longitudinal center line of the draw bar. Furthermore, providing a right hole stop 64 and a left hole stop 66 on the body, the right and left hole stop for receiving a stop pin 68. Furthermore, wherein the pie-shaped draw bar is effectively sized so that when the right outer edge 56 of the draw bar contacts the stop pin 68 of the right hole stop 64 the center third aperture 31 is aligned with a longitudinal center line of the draw bar and when the left outer edge 56 of the draw bar contacts the stop pin 68 of the left hole stop 66 the center third aperture 31 is aligned with a longitudinal center line of the draw bar. Lastly, wherein a rear portion 70 of the slot 47 is equidistance from the nearest first aperture 48 to its rear as the distance between each of the at least one apertures 38 of the receiving tube. Also, each group of apertures 30, 31, and 33 are generally arrayed in a semi-circle with the members of each group being about equidistance from pivot pin 26.

I claim:

1. An adjustable trailer hitch for connecting a trailer to a vehicle, the vehicle having a receiving tube mounted thereon, the receiving tube having at least one aperture extending horizontally therethrough, comprising:
  a) a slide tube having front and rear end portions and upper and lower surfaces, wherein said front end portion of said slide tube is slidably insertable into and removable from the receiving tube, said slide tube having at least one first aperture extending horizontally therethrough, said slide tube having a slot extending horizontally therethrough, wherein said slot is longitudinally elongated;
  b) a body having front and rear end portions, upper and lower portions, and left and right side portions, a left stop being disposed on said left side portion and a right stop being disposed on said right side portion, wherein said lower front portion is disposed on said upper, rear of said slide tube, said body having an interior space therein, wherein said interior space is formed between and bounded by said upper and lower portions, said body having a plurality of second apertures extending vertically therethrough, wherein said second apertures pass entirely through said upper and lower portions and are disposed adjacent said rear portion of said body in a spaced apart relationship between said left and right side portions;
  c) a pivot pin being generally vertically disposed in said body;
  d) a pie-shaped draw bar having front and rear end portions and left and right outer edges being disposed in said interior space of said body, said front portion being connected to said pivot pin, said rear portion extending from said rear of said interior space an effective distance to allow for a plurality of third apertures mounted thereon so that each third aperture has a differently sized ball mounted therein, said draw bar having a plurality of fourth apertures extending vertically therethrough;
  e) wherein said draw bar is laterally pivotable on said pivot pin between said first and said second side portions of said body so that said balls can be moved laterally back and forth between said first and second side portions of said body, wherein said fourth apertures are configured to align with said plurality of second apertures as said draw bar pivots laterally between said first and second side portions of said body whereby a selected ball is aligned with said slide tube to match requirements of said trailer tongue;
  f) a first locking pin being removably inserted into said plurality of second apertures and said fourth apertures so that said draw bar is locked into a user selected aperture of said plurality of second apertures as said draw bar pivots laterally between said first and second side portions of said body;
  g) a second locking pin being removably insertable into said first aperture of said slide tube and the aperture of the receiving tube so that the slide tube is locked into a user selected first aperture of said slide tube so that the ball on said draw bar can be moved back and forth in the longitudinal direction relative to the vehicle;
  h) each said third aperture being threaded, and each ball comprising a downwardly extending threaded male member for engaging one of said third apertures; and
  i) at least one of said balls having said downwardly extending threaded male member comprising a removable vertical extension comprising an extended member having female threads at an upper end thereof for engaging the downwardly extending threaded male member, and an additional downwardly extending threaded male member from a lower end thereof for engaging said at least one of said third apertures, allowing said at least one of said balls to extend above any adjacent balls.

2. The apparatus of claim 1, wherein said lower front portion of said body is disposed on said upper surface of said rear portion of said slide tube.

3. The apparatus of claim 1, wherein the number of second apertures ranges from three to five.

4. The apparatus of claim 1, wherein a top view of said draw bar resembles a slice of pie.

5. The apparatus of claim 1, wherein a top view of the apparatus shows that a widest point of said draw bar is slightly wider than said body.

6. The apparatus of claim 1, wherein said pie-shaped draw bar is effectively sized so that when said right outer edge of said draw bar contacts said right stop of said body said left fourth aperture is aligned with a longitudinal center line of said draw bar and when said left outer edge of said draw bar contacts said left stop of said body said right fourth aperture is aligned with a longitudinal center line of said draw bar.

7. A method for making an adjustable trailer hitch for connecting a trailer to a vehicle, the vehicle having a receiving tube mounted thereon, the receiving tube having at least one aperture extending horizontally therethrough, comprising the steps of:
  a) providing a slide tube having front and rear end portions and upper and lower surfaces, wherein the front end portion of the slide tube is slidably insertable into and removable from the receiving tube, the slide tube having at least one first aperture extending horizontally therethrough, the slide tube having a slot extending horizontally therethrough, wherein the slot is longitudinally elongated;
  b) providing a body having front and rear end portions, upper and lower portions, and left and right side portions, a left stop being disposed on the left side portion and a right stop being disposed on the right side portion, wherein the lower front is disposed on the upper, rear of the slide tube, the body having an interior space therein, wherein the interior space is formed between and bounded by the upper and lower portions, the body having a plurality of second apertures extending vertically therethrough, wherein the second apertures pass entirely through the upper and lower portions and are disposed adjacent the rear portion of the body in a spaced apart relationship between the left and right side portions;
  c) mounting a pivot pin generally vertically in the body;
  d) providing a pie-shaped draw bar having front and rear end portions and left and right outer edges being disposed in the interior space of the body, the front portion being connected to the pivot pin, the rear portion extending from the rear of the interior space an effective distance to allow for a plurality of third apertures to be mounted thereon so that each third aperture has a ball mounted therein providing at least three balls to be mounted thereon, the draw bar having a plurality of fourth apertures extending vertically therethrough;

e) wherein the draw bar is laterally pivotable on the pivot pin between the first and the second side portions of the body so that the three balls can be moved laterally back and forth between the first and second side portions of the body, wherein the fourth apertures are configured to align with the plurality of second apertures as the draw bar pivots laterally between the first and second side portions of the body;

f) providing a first locking pin being removably inserted into the plurality of second apertures and the fourth apertures so that the draw bar can be locked into a user selected aperture of the plurality of second apertures as the draw bar pivots laterally between the first and second side portions of the body;

g) providing a second locking pin being removably insertable into the first aperture of the slide tube and the aperture of the receiving tube so that the slide tube can be locked into a user selected first aperture of the slide tube so that the ball on the draw bar can be moved back and forth in the longitudinal direction relative to the vehicle;

h) each said third aperture being threaded, and each ball comprising a downwardly extending threaded male member for engaging one of said third apertures; and i) at least one of said balls having said downwardly extending threaded male member comprising a removable vertical extension comprising an extended member having female threads at an upper end thereof for engaging the downwardly extending threaded male member, and an additional downwardly extending threaded male member from a lower end thereof for engaging said at least one of said third apertures, allowing said at least one of said balls to extend above any adjacent balls.

8. The method of claim 7, wherein the lower front portion of the body is disposed on the upper surface, rear portion of the slide tube.

9. The method of claim 7, wherein the number of second apertures ranges from three to five.

10. The method of claim 7, wherein a top view of the draw bar resembles a slice of pie.

11. The method of claim 7, wherein a top view of the apparatus shows that a widest point of said draw bar is slightly wider than said body.

12. The method of claim 7, wherein the pie-shaped draw bar is effectively sized so that when the right outer edge of the draw bar contacts the right stop of the body the left fourth aperture is aligned with a longitudinal center line of the draw bar and when the left outer edge of the draw bar contacts the left stop of the body the right fourth aperture is aligned with a longitudinal center line of the draw bar.

13. The method of claim 7, wherein a rear portion of the slot is equidistance from the nearest first aperture to its rear as the distance between each of the at least one apertures of the receiving tube.

14. An apparatus for an adjustable trailer hitch for connecting a trailer to a vehicle, the vehicle having a receiving tube mounted thereon, the receiving tube having at least one aperture extending horizontally therethrough, comprising:

a) a slide tube having front and rear end portions and upper and lower surfaces, wherein said front end portion of said slide tube is slidably insertable into and removable from the receiving tube, said slide tube having at least one first aperture extending horizontally therethrough, said slide tube having a slot extending horizontally therethrough, wherein said slot is longitudinally elongated;

b) a body having front and rear end portions, upper and lower portions, and left and right side portions, a left stop being disposed on said left side portion and a right stop being disposed on said right side portion, wherein said lower front portion is disposed on said upper, rear of said slide tube, said body having an interior space therein, wherein said interior space is formed between and bounded by said upper and lower portions, said body having a plurality of second apertures extending vertically therethrough, wherein said second apertures pass entirely through said upper and lower portions and are disposed adjacent said rear portion of said body in a spaced apart relationship between said left and right side portions;

c) a pivot pin being generally vertically disposed in said body;

d) a pie-shaped draw bar having front and rear end portions and left and right outer edges being disposed in said interior space of said body, said front portion being connected to said pivot pin, said rear portion extending from said rear of said interior space an effective distance to allow for a plurality of third apertures to be mounted thereon so that each third aperture has a ball mounted therein providing at least three balls to be mounted thereon, said draw bar having a plurality of fourth apertures extending vertically therethrough;

e) wherein said draw bar is laterally pivotable on said pivot pin between said first and said second side portions of said body so that said three balls can be moved laterally back and forth between said first and second side portions of said body, wherein said fourth apertures are configured to align with said plurality of second apertures as said draw bar pivots laterally between said first and second side portions of said body;

f) a first locking pin being removably inserted into said plurality of second apertures and said fourth apertures so that said draw bar is locked into a user selected aperture of said plurality of second apertures as said draw bar pivots laterally between said first and second side portions of said body;

g) a second locking pin being removably insertable into said first aperture of said slide tube and the aperture of the receiving tube so that the slide tube can be locked into a user selected first aperture of said slide tube so that the ball on said draw bar can be moved back and forth in the longitudinal direction relative to the vehicle;

h) a right hole stop and a left hole stop being disposed on said body, said right and left hole stop for receiving a stop pin; and i) wherein said pie-shaped draw bar is effectively sized so that when said right outer edge of said draw bar contacts said stop pin of said right hole stop said center third aperture is aligned with a longitudinal center line of said draw bar and when said left outer edge of said draw bar contacts said stop pin of said left hole stop said center third aperture is aligned with a longitudinal center line of said draw bar.

15. A method for making an adjustable trailer hitch for connecting a trailer to a vehicle, the vehicle having a receiving tube mounted thereon, the receiving tube having at least one aperture extending horizontally therethrough, comprising the steps of:
a) providing a slide tube having front and rear end portions and upper and lower surfaces, wherein the front end portion of the slide tube is slidably insertable into and removable from the receiving tube, the slide tube having at least one first aperture extending horizontally therethrough, the slide tube having a slot extending horizontally therethrough, wherein the slot is longitudinally elongated;
b) providing a body having front and rear end portions, upper and lower portions, and left and right side portions, a left stop being disposed on the left side portion and a right stop being disposed on the right side portion, wherein the lower front is disposed on the upper, rear of the slide tube, the body having an interior space therein, wherein the interior space is formed between and bounded by the upper and lower portions, the body having a plurality of second apertures extending vertically therethrough, wherein the second apertures pass entirely through the upper and lower portions and are disposed adjacent the rear portion of the body in a spaced apart relationship between the left and right side portions;
c) mounting a pivot pin generally vertically in the body;
d) providing a pie-shaped draw bar having front and rear end portions and left and right outer edges being disposed in the interior space of the body, the front portion being connected to the pivot pin, the rear portion extending from the rear of the interior space an effective distance to allow for a plurality of third apertures to be mounted thereon so that each third aperture has a ball mounted therein providing at least three balls to be mounted thereon, the draw bar having a plurality of fourth apertures extending vertically therethrough;
e) wherein the draw bar is laterally pivotable on the pivot pin between the first and the second side portions of the body so that the three balls can be moved laterally back and forth between the first and second side portions of the body, wherein the fourth apertures are configured to align with the plurality of second apertures as the draw bar pivots laterally between the first and second side portions of the body;
f) providing a first locking pin being removably inserted into the plurality of second apertures and the fourth apertures so that the draw bar can be locked into a user selected aperture of the plurality of second apertures as the draw bar pivots laterally between the first and second side portions of the body;
g) providing a second locking pin being removably insertable into the first aperture of the slide tube and the aperture of the receiving tube so that the slide tube can be locked into a user selected first aperture of the slide tube so that the ball on the draw bar can be moved back and forth in the longitudinal direction relative to the vehicle;
h) providing a right hole stop and a left hole stop on the body, the right and left hole stop for receiving a stop pin; and
i) wherein the pie-shaped draw bar is effectively sized so that when the right outer edge of the draw bar contacts the stop pin of the right hole stop the center third aperture is aligned with a longitudinal center line of the draw bar and when the left outer edge of the draw bar contacts the stop pin of the left hole stop the center third aperture is aligned with a longitudinal center line of the draw bar.

\* \* \* \* \*